(12) United States Patent
Datar et al.

(10) Patent No.: US 8,839,088 B1
(45) Date of Patent: Sep. 16, 2014

(54) DETERMINING AN ASPECT VALUE, SUCH AS FOR ESTIMATING A CHARACTERISTIC OF ONLINE ENTITY

(75) Inventors: Mayur Dhondu Datar, Santa Clara, CA (US); Shanmugavelayutham Muthukrishnan, New York, NY (US); Manjunath Srinivasaiah, New York, NY (US)

(73) Assignee: Google Inc., Mountain View, CA (US)

(*) Notice: Subject to any disclaimer, the term of this patent is extended or adjusted under 35 U.S.C. 154(b) by 819 days.

(21) Appl. No.: 12/111,017

(22) Filed: Apr. 28, 2008

Related U.S. Application Data

(63) Continuation-in-part of application No. 11/934,226, filed on Nov. 2, 2007.

(51) Int. Cl.
*G06F 3/00* (2006.01)

(52) U.S. Cl.
USPC ........................................... 715/206

(58) Field of Classification Search
USPC ...................... 715/206, 234, 243, 254, 255
See application file for complete search history.

(56) References Cited

U.S. PATENT DOCUMENTS

| | | | |
|---|---|---|---|
| 5,870,744 A | 2/1999 | Sprague | |
| 6,041,311 A | 3/2000 | Chislenko et al. | |
| 6,438,579 B1 | 8/2002 | Hosken | |
| 6,681,247 B1 | 1/2004 | Payton | |
| 6,950,987 B1 | 9/2005 | Hargraves et al. | |
| 7,130,808 B1 | 10/2006 | Ranka et al. | |
| 7,181,412 B1 | 2/2007 | Fulgoni et al. | |
| 7,213,032 B2 | 5/2007 | Mascarenhas | |
| 7,284,008 B2 | 10/2007 | Henkin et al. | |
| 7,318,066 B2 | 1/2008 | Kaufman et al. | |
| 7,349,899 B2 | 3/2008 | Namba | |
| 7,403,941 B2 | 7/2008 | Bedworth et al. | |
| 7,406,434 B1 | 7/2008 | Chang et al. | |
| 7,451,099 B2 | 11/2008 | Henkin et al. | |
| 7,493,655 B2 | 2/2009 | Brown | |
| 7,698,422 B2 | 4/2010 | Vanderhook et al. | |
| 7,707,091 B1 | 4/2010 | Kauffman et al. | |
| 7,734,632 B2 | 6/2010 | Wang | |
| 7,761,423 B1 | 7/2010 | Cohen | |
| 7,783,532 B2 | 8/2010 | Hsu et al. | |

(Continued)

FOREIGN PATENT DOCUMENTS

WO   WO200604455   4/2006

OTHER PUBLICATIONS comScore, Inc. Home page, Product pages: Ad Metrix, [online]. comScore, Inc. [retrieved on Sep. 2, 2008]. Retrieved from the Internet http://www.comscore.com/.

(Continued)

*Primary Examiner* — Kyle Stork
(74) *Attorney, Agent, or Firm* — Fish & Richardson P.C.

(57) ABSTRACT

Among other disclosed subject matter, a computer-implemented method for determining an aspect value includes identifying a first entity associated with a first aspect that has a first value. The method includes identifying a second entity as connected to the first entity. The method includes determining a second value for a second aspect of the second entity. The method includes determining, for a third entity, a third value for the first aspect, the third value determined using at least the determined second value. Implementations can be used to evaluate truthfulness of self-reported information from members of online communities, to name one example.

16 Claims, 5 Drawing Sheets

(56) References Cited

U.S. PATENT DOCUMENTS

| | | | |
|---|---|---|---|
| 7,870,021 | B2 | 1/2011 | Mankoff |
| 7,930,285 | B2 | 4/2011 | Abraham et al. |
| 8,073,807 | B1 | 12/2011 | Srinivasaiah |
| 8,095,589 | B2 | 1/2012 | Singh et al. |
| 8,190,475 | B1 | 5/2012 | Merrill |
| 2002/0004733 | A1 | 1/2002 | Addante |
| 2002/0123928 | A1 | 9/2002 | Eldering et al. |
| 2004/0002943 | A1 | 1/2004 | Merrill et al. |
| 2004/0064415 | A1* | 4/2004 | Abdallah et al. ............... 705/50 |
| 2004/0153514 | A1* | 8/2004 | Crane ........................ 709/206 |
| 2005/0256756 | A1 | 11/2005 | Lam et al. |
| 2005/0267766 | A1* | 12/2005 | Galbreath et al. ............... 705/1 |
| 2006/0106780 | A1* | 5/2006 | Dagan ............................. 707/3 |
| 2006/0167971 | A1 | 7/2006 | Breiner |
| 2006/0200556 | A1 | 9/2006 | Brave et al. |
| 2007/0038516 | A1 | 2/2007 | Apple et al. |
| 2007/0073681 | A1 | 3/2007 | Adar et al. |
| 2007/0089150 | A1 | 4/2007 | Bowler |
| 2008/0065701 | A1* | 3/2008 | Lindstrom et al. ............ 707/201 |
| 2008/0104225 | A1 | 5/2008 | Zhang et al. |
| 2008/0120308 | A1* | 5/2008 | Martinez et al. ............. 707/100 |
| 2008/0126411 | A1 | 5/2008 | Zhuang et al. |
| 2008/0140508 | A1 | 6/2008 | Anand et al. |
| 2008/0140524 | A1 | 6/2008 | Anand et al. |
| 2008/0155078 | A1* | 6/2008 | Parkkinen et al. ............ 709/223 |
| 2008/0215607 | A1 | 9/2008 | Kaushansky et al. |
| 2008/0242279 | A1 | 10/2008 | Ramer et al. |
| 2008/0263053 | A1 | 10/2008 | Hull |
| 2008/0270425 | A1 | 10/2008 | Cotgreave |
| 2008/0275980 | A1 | 11/2008 | Hansen |
| 2009/0029687 | A1 | 1/2009 | Ramer et al. |
| 2009/0055139 | A1 | 2/2009 | Agarwal et al. |
| 2009/0061406 | A1 | 3/2009 | Clayton et al. |
| 2010/0164957 | A1 | 7/2010 | Lindsay et al. |
| 2010/0205037 | A1 | 8/2010 | Besehanic |

OTHER PUBLICATIONS

QuestionPro Home page, Product page: Survey Software [online] QuestionPro. [retrieved on Sep. 2, 2008]. Retrieved from the Internet: <http://www.questionpro.com/>.

Hu, Jian, et al., "Demographic Prediction Based on User's Browsing Behavior," International World Wide Web Conference Committee (IW3C2), WWW 2007, May 8-12, 2007, Banff, Alberta, Canada, 10 pages.

"Logit," Wikipedia [online], Retrieved from the Internet: <http://en.wikipedia.org/wiki/Logit>, retrieved on Aug. 2, 2007, 2 pages.

"Expectation-maximization algorithm," Wikipedia [online], Retrieved from the Internet: <http://en.wikipedia.org/wiki/Expectation-maximization_algorithm>, retrieved on Jun. 15, 2007, 9 pages.

"Bernoulli distribution," Wikipedia [online], Retrieved from the Internet: <http://en.wikipedia.org/wiki/Bernoulli_distribution>, retrieved on Sep. 22, 2009, published on Aug. 28, 2009, 2 pages.

"Binomial distribution," PlanetMath.Org [online], Retrieved from the Internet: <http://planetmath.org/?op=getobj&from=objects&name=BernoulliDistribution2>, retrieved on Jun. 15, 2007, 4 pages.

People's Daily Online, 'MySpace steps up security for teen users' [online] [retrieved on Jul. 17, 2009. Retrieved from the Internet:http://english.peopledaily.com.cn/200606/23/eng20060623_276550.html.

NetIDme Home Page, 'NetIDme provides secure age and identify verification for the internet' [online] [retrieved on Jul. 17, 2009]. Retrieved from the Internet: http://web.archive.org/web/20070629100031/http://netideme.net/netidauthrenticate.htm.

comScore, Inc. Home page, Product pages: Brand Metrix, [online]. comScore, Inc. [retrieved on Sep. 2, 2008]. Retrieved from the Internet http://www.comscore.com/.

comScore, Inc. Home page, Product pages: Campaign Metrix, [online]. comScore, Inc. [retrieved on Sep. 2, 2008]. Retrieved from the Internet http://www.comscore.com/.

comScore, Inc. Home page, Product pages: Marketer, [online]. comScore, Inc. [retrieved on Sep. 2, 2008]. Retrieved from the Internet http://www.comscore.com/.

comScore, Inc. Home page, Product pages: Marketing Solutions, [online]. comScore, Inc. [retrieved on Sep. 2, 2008]. Retrieved from the Internet http://www.comscore.com/.

comScore, Inc. Home page, Product pages: Media Metrix Campaign R/F™, [online] comScore, Inc. [retrieved on Sep. 2, 2008]. Retrieved from the Internet http://www.comscore.com/.

comScore, Inc. Home page, Product pages: U.S. Hispanic Services, [online]. comScore, Inc. [retrieved on Sep. 2, 2008]. Retrieved from the Internet http://www.comscore.com/.

comScore, Inc. Home page, Product pages: LocalScore, [online]. comScore, Inc. [retrieved on Sep. 2, 2008]. Retrieved from the Internet http://www.comscore.com/.

comScore, Inc. Home page, Product pages: Local Market Reporting, [online]. comScore, Inc. [retrieved on Sep. 2, 2008]. Retrieved from the Internet http://www.comscore.com/.

comScore, Inc. Home page, Product pages: Online Search Solutions, [online]. comScore, Inc. [retrieved on Sep. 2, 2008]. Retrieved from the Internet http://www.comscore.com/.

comScore, Inc. Home page, Product pages: Plan Metrix, [online]. comScore, Inc. [retrieved on Sep. 2, 2008]. Retrieved from the Internet http://www.comscore.com/.

comScore, Inc. Home page, Product pages: Segment Metrix H/M/L, [online]. comScore, Inc. [retrieved on Sep. 2, 2008]. Retrieved from the Internet http://www.comscore.com/.

comScore, Inc. Home page, Product pages: Video Metrix, [online]. comScore, Inc. [retrieved on Sep. 2, 2008]. Retrieved from the Internet http://www.comscore.com/.

comScore, Inc. Home page, Product pages: Widget Metrix [online]. comScore, Inc. [retrieved on Sep. 2, 2008]. Retrieved from the Internet http://www.comscore.com/.

'Online Survey Software' [online]. QuestionPro 2006, [retrieved on Sep. 2, 2008]. Retrieved from the Internet: http://www.questionpro.com/products/index.html.

'Survey Software' [online]. QuestionPro 2007, [retrieved on Sep. 2, 2008]. Retrieved from the Internet: http://www.questionpro.com.

'Security and Privacy' [online]. QuestionPro 2006, [retrieved on Sep. 2, 2008]. Retrieved from the Internet: http://www.questionpro.com/security/index.html.

'Testimonials' [online]. QuestionPro 2006, [retrieved on Sep. 2, 2008]. Retrieved from the Internet: http://www.questionpro.com/clients/comments.html.

'Sample Surveys—Sample Survey Questions—Survey Questions' [online]. QuestionPro 2006, [retrieved on Sep. 2, 2008]. Retrieved from the Internet: http://www.questionpro.com/sample/index.html.

Yang, Wan-Shiou, Dia, Jia-Ben, Cheng, Hung-Chi, and Lin, Hsing-Tzu, 'Mining Social Networks for Targeted Advertising' *Proceedings of the 39th Hawaii International Conference on System Sciences—2006*, pp. 1-10.

Herlocker, Jonathan L., Konstan, Joseph A., Terveen, Loren G., and Riedl, John T., 'Evaluating Collaborative Filtering Recommender Systems' *ACM Transactions on Information Systems*, vol. 22, No. 1, Jan. 2004, pp. 1-53.

'Support Vector Machine' [online], Wikipedia, [published on Sep. 13, 2006] [retrieved on May 21, 2009]. Retrieved from the Internet: http://web.archive.org/web/20060913000000/http://en.wikipedia.org/wiki/support_vector_machine.

Marks, Paul 'New Software can Identify You from Your Online Habits' [online], *NewScientist Tech*, [published on May 16, 2007] [retrieved on May 21, 2009]. Retrieved from: http://www.newscientist.com/article/mg19426046.400.

Macskassy, Sofus A., and Provost, Foster, 'A Simple Relational Classifer' *NYU Stern School of Business* [published 2003].

'Note on Terminology' [online], Wikipedia, [published on Sep. 13, 2006], [retrieved on May 21, 2009]. Retrieved from: http://web.archive.org/20060913000000/http://en.wikipedia.org/wiki/decision_tree.

Rudin, Cynthia, Daubechies, Ingrid and Schapire, Robert E., 'Dynamics of AdaBoost' May 2005, *NSF Postdoc*, BIO Division, Center for Neural Science, NYU.

comScore, Inc. Home page, Product pages: comscore,Inc.—a Global Internet Information Provider, [online]. comScore, Inc. [retrieved on Sep. 2, 2008]. Retrieved from the Internet http://www.comscore.com/.

(56) References Cited

OTHER PUBLICATIONS

'QuestionPro' [online]. QuestionPro Survey Software, 2006 [retrieved on May 12, 2011]. Retrieved from the Internet: <URL: http://replay.web.archive.org/20061028220630/http://www.questionpro.com/>.

'Market Research' [online]. QuestionPro Survey Software, 2006 [retrieved on May 12, 2011]. Retrieved from the Internet: <URL: http://replay.web.archive.org/20061113103908/http:/www.questionpro.com/marketresearch/>.

'How it works' [online]. QuestionPro Survey Software, 2006 [retrieved on May 12, 2011]. Retrieved from the Internet: <URL: http://replay.web.archive.org/20061108115455/http:/www.questionpro.com/home/howItWorks.html>.

'Creating Your Survey' [online]. QuestionPro Survey Software, 2006 [retrieved on May 12, 2011]. Retrieved from the Internet: <URL: http://replay.web.archive.org/20061113133650/http:/www.questionpro.com/buildyoursurvey/>.

'Collecting Survey Results' [online]. QuestionPro Survey Software, 2006 [retrieved on May 12, 2011]. Retrieved from the Internet: <URL: http://replay.web.archive.org/20061113133653/http:/www.questionpro.com/collectyourdata/>.

'Automatic Reporting, Charts, Graphs' [online]. QuestionPro Survey Software, 2006 [retrieved on May 12, 2011]. Retrieved from the Internet: <URL: http://replay.web.archive.org/20061113133657/http:/www.questionpro.com/viewyourresults/>.

'Sample Surveys' [online]. QuestionPro Survey Software, 2006 [retrieved on May 12, 2011]. Retrieved from the Internet: <URL: http://replay.web.archive.org/20061113133701/http:/www.questionpro.com/sample/>.

Smart AdServer; Wikipedia; http://en.wikipedia.org/wiki/Smart_AdServer; accessed May 26, 2011.

USPTO STIC search May 21, 2011; SN12204679NPL.pdf.

USPTO STIC search Jun. 3, 2011; SN12204679NPL2.pdf.

'QuestionPro' [online]. QuestionPro Survey Software, 2006 [retrieved on May 12, 2011]. Retrieved from the Internet: <URL: http://replay.web.archive.org/20061028220630/http://www.questionpro.com>.

'Market Research' [online]. QuestionPro Survey Software, 2006 [retrieved on May 12, 2011]. Retrieved from the Internet: <URL: http://replay.web.archive.org/20061113103908/http:/www.questionpro.com./marketresearch/>.

'How it works' [online]. ]. QuestionPro Survey Software, 2006 [retrieved on May 12, 2011]. Retrieved from the Internet: <URL: http://replay.web.archive.org/20061108115455/http:/www.questionpro.com/home/howItWorks.html>.

USPTO Non-Final Office Action in U.S. Appl. No. 11/934,226, mailed Sep. 29, 2010, 15 pages.

USPTO Final Office Action in U.S. Appl. No. 11/934,226, mailed Apr. 7, 2011, 14 pages.

USPTO Notice of Allowance in U.S. Appl. No. 11/934,226, mailed Sep. 22, 2011, 9 pages.

Dialog Non-Patent Literature Search Dec. 21, 2011.

MacKinnon et al. "Age and Geographic Inferences of the LiveJournal Social Network," 23rd International Conference on Machine Learning, 2006, 8 pages.

'Online Research Made Easy', [brochure], QuestionPro 2007, 8 pages.

* cited by examiner

DETERMINING AN ASPECT VALUE, SUCH AS FOR ESTIMATING A CHARACTERISTIC OF ONLINE ENTITY

CROSS-REFERENCE TO RELATED APPLICATION

This application is a continuation-in-part of and claims priority from U.S. patent application Ser. No. 11/934,226, entitled "Inferring Demographics for Website Members" and filed Nov. 2, 2007, the entire contents of which are incorporated herein by reference.

TECHNICAL FIELD

This document relates to information management.

BACKGROUND

The online environment is populated by many entities of different sorts. For example, human beings engage in various activities online such as participating in social networks, contributing to discussion groups or visiting chat rooms, corresponding with others, exchanging files, and other activities as well, to name just a few examples. Entities that are not living persons, such as organizations or other legal entities, can also have a substantial presence online and be involved in one or more undertakings.

Entities can have a more or less well-defined persona (e.g., an identity) connected with their online presence. Sometimes, a characteristic of such a persona can be displayed or otherwise made available to others (e.g., to another online entity) while engaging in some activity. For example, the participants in a chat room can be identified by having respective unique user names to distinguish them from the other participants. The user name, then, and/or any other characteristic that is associated with the chat room visitor, can be considered part of that visitor's online persona.

The online user's persona sometimes includes one or more characteristics that can be considered self-declared. For example, when a person seeks to become a member in an online social network the person can be asked or required as part of applying for membership to provide their age, either as an exact number or as a range of years. The user sometimes provides other characteristics, such as their sex, profession, marital status or a listing of hobbies. Some information can be shared for establishing identity, such as billing information or address, to name two examples. Sometimes, such information is collected only for the benefit of the social network (or other organization) itself, and is not intended to be shared with anyone else. In other situations, however, there is an explicit understanding from the applicant's side that the collected information is to be shared or otherwise made available to others, for example in form of a profile on the new member that is available through the online organization.

SUMMARY

The invention relates to determining an aspect value.
In a first aspect, a computer-implemented method for determining an aspect value includes identifying a first entity associated with a first aspect that has a first value. The method includes identifying a second entity as connected to the first entity. The method includes determining a second value for a second aspect of the second entity. The method includes determining, for a third entity, a third value for the first aspect, the third value determined using at least the determined second value.

Implementations can include any, all or none of the following features. The method can further include identifying, before determining the third value, a stated value for the first aspect associated with the third entity, wherein the third value is determined to estimate whether the stated value is correct. The first entity can have connected therewith a first plurality of entities including the second entity and the third entity can have connected therewith a second plurality of entities, and the method can further include determining a first distribution regarding at least some of the first plurality of entities; determining a second distribution regarding at least some of the second plurality of entities; and comparing the first distribution with the second distribution; wherein the comparison is used in determining the third value. The method can further include determining, before determining the third value, that no stated value for the first aspect associated with the third entity has been identified, and wherein the third value is determined as an estimate. There can be multiple first entities associated with different values, and the method can further include identifying multiple second entities as connected to the respective multiple first entities; and determining multiple second values for the second aspect for the respective multiple second entities; wherein a distribution of the multiple second values is used in determining the third value. The first aspect can be identical to the second aspect. The method can further include determining an additional value for an additional aspect of the second entity; wherein also the determined additional value is used in determining the third value. The method can further include determining the connection of the second entity to the first entity, the connection determined by at least one of: identifying a hyperlink from the first entity to the second entity; identifying a link from the first entity to the second entity in an online social network that includes the first and second entities; determining that the first entity and the second entity meet a similarity criterion; determining that the first entity and the second entity are online resources having sets of visitors that overlap at least in part; determining that the first entity and the second entity are online resources having a common author; determining that the first entity and the second entity are online resources cited by another resource; and combinations thereof. The first entity can be a participant in a first online resource and the second entity can be a participant in a second online resource, and the method can further include identifying a global connection between the first and second online resources; and determining the connection of the second entity to the first entity based at least in part on the global connection.

In a second aspect, a computer program product is tangibly embodied in a computer-readable medium and includes instructions that when executed by a processor perform a method for determining an aspect value. The method includes identifying a first entity associated with a first aspect that has a first value. The method includes identifying a second entity as connected to the first entity. The method includes determining a second value for a second aspect of the second entity. The method includes determining, for a third entity, a third value for the first aspect, the third value determined using at least the determined second value.

In a third aspect, a computer-implemented method for determining a characteristic for an entity includes identifying a first entity having connected therewith a first plurality of entities. The method includes determining a distribution regarding at least some of the first plurality of entities. The method includes comparing the determined distribution with at least one reference distribution. The method includes determining a characteristic of the first entity based at least in part on the comparison.

Implementations can include any, all or none of the following features. The method can further include determining the reference distribution using a second entity having connected therewith a second plurality of entities. The determined distribution can be compared with multiple reference distributions and determining the characteristic can include identifying one of the multiple reference distributions as matching the reference distribution. The method can further include determining the connections of the first plurality of entities to the first entity, the connection determined by at least one of: identifying a hyperlink from any of the first plurality of entities to the first entity; identifying a link from any of the first plurality of entities to the first entity in an online social network that includes the first entity and any of the first plurality of entities; determining that the first entity and any of the first plurality of entities meet a similarity criterion; determining that the first entity and any of the first plurality of entities are online resources having sets of visitors that overlap at least in part; determining that the first entity and any of the first plurality of entities are online resources having a common author; determining that the first entity and any of the first plurality of entities are online resources cited by another resource; and combinations thereof. The first entity can be a participant in a first online resource and at least one of the first plurality of entities can be a participant in a second online resource, and the method can further include identifying a global connection between the first and second online resources; and determining the connection of the at least one of the first plurality of entities to the first entity based on the global connection.

In a fourth aspect, a computer program product is tangibly embodied in a computer-readable medium and includes instructions that when executed by a processor perform a method for determining a characteristic for an entity. The method includes identifying a first entity having connected therewith a first plurality of entities. The method includes determining a distribution regarding at least some of the first plurality of entities. The method includes comparing the determined distribution with at least one reference distribution. The method includes determining a characteristic of the first entity based at least in part on the comparison.

In a fifth aspect, a computer-implemented method for determining an aspect value includes identifying a first entity associated with a first aspect that has a first value. The method includes identifying a second entity as connected to the first entity. The method includes determining a second value for a second aspect of the second entity. The method includes determining a probability value for the first value using at least the determined second value.

Implementations can include any, all or none of the following features. The first and second entities can be members of, and connected with each other through, an online community, and the first value can be associated with the first aspect based on an input made by the first entity in response to a prompt from the online community regarding the first aspect. The method can further include recording the probability value as an indication of a truthfulness of the first entity in providing the first value as a response to the prompt regarding the first aspect. The method can further include determining whether the probability value meets a probability criterion; and upon determining that the probability value does not meet the probability criterion, taking an action with regard to the first entity.

Implementations can provide any, all or none of the following advantages. Aspect value determination can be improved. The methods described can be used to expand knowledge about entities. The aspect values entities declare can be enhanced with inference about other attributes and aspects.

Some implementations can be used to validate the truthfulness of declared aspect values, such as a statement by a member of an online community, by comparing the aspect value distribution inferred from the methods against the declared aspect value by the entity. Online communities can be evaluated with greater transparency.

Some implementations can be used to infer and attribute a particular aspect value to an entity, either with certainty, or with certain probability of having an aspect value. Such an inference can be used in many ways, including but not limited to targeting ads in online social worlds, packaging a service offering, and/or determining nefarious entities. Behavior of entities can be predicted based on the aspect value.

In some implementations, the aspect value distribution inferred from the methods described may be used to prompt or warn users to verify declared values where it is suspected that the user may have made a mistake in declaring the values. For example, users may overlook pull down menus and leave responses to fields, such as "year of birth", as default values. Implementations may be used to identify genuine data input mistakes from a user, as opposed to willful or malicious hiding, or misrepresentation on their behalf.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
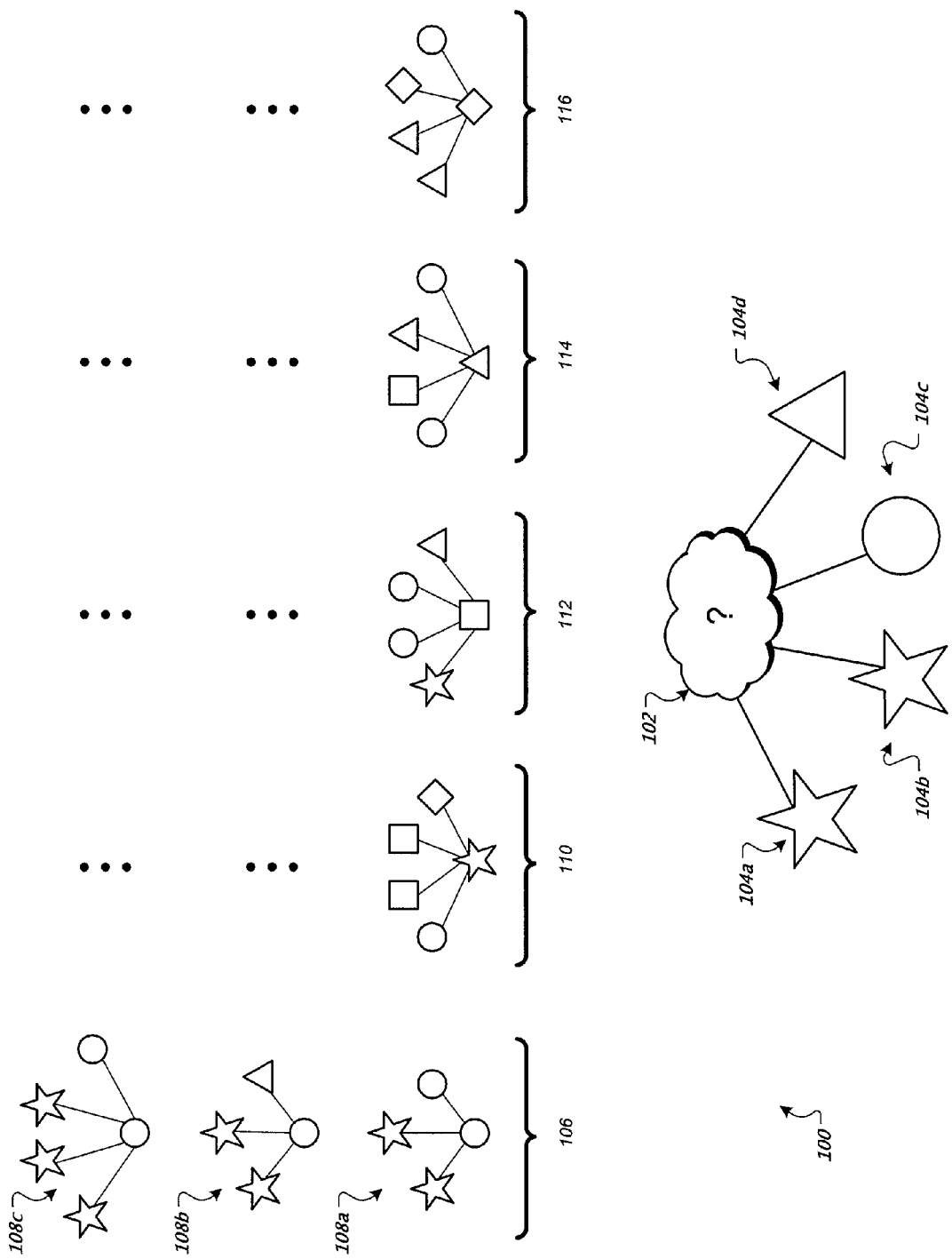
FIG. 1 depicts an assembly of information that can be generated to infer characteristics or aspects of an entity.

FIG. 1 conceptually illustrates an assembly of information 100 that can be generated to infer one or more characteristics or aspects of an electronic entity. For example, the information 100 can be gathered in performing a method of determining an aspect, such the age, of a primary person 102. The person 102 is here represented by a question mark to indicate an uncertainty regarding the person. Such an aspect can in some implementations be estimated or determined using a network of other persons or entities that have identifiable connections with the person.

The primary person may be a member of a blog, or a social networking website, such as MySpace, to name two examples. For example, the user may have created a personal webspace on MySpace or created a user profile on a blogging website. The primary person 102 may have stated values for certain aspects such as age, interests, or marital status, to name a few. In some instances values for a particular aspect may not be stated or known. For example, no information might be available as to whether the person is 18 or 70 years old. In other instances a value for a particular aspect may be stated, but suspect. For example, anyone who creates an online profile could claim to be 18 years old whether they are or not. In the following, there will be described examples of how entities connected to the person at issue can be evaluated to determine or estimate the unknown age or, in cases where an age is stated, attempt to verify if it is correct.

In various implementations, an aspect may have a discrete value, or belong to a range of values. For example, the age value of the primary person may be the discrete value "19" or it may have the value category "18 to 25". Other aspects may have other discrete values or categories. An aspect may have multiple values or multiple categories. For example, a "music interests" aspect may contain the values "Green Day" and "Yellowcard", or in a second example may consist values representing the broad categories "Classical" and "Country". Other aspects can be estimated and/or determined. Such aspects can involve other concepts including, but not limited to: factors of life, such as residence, marital status, and employment status, or subjective factors, such as product preferences or political opinions, to name just a few examples.

In some implementation, the determination and/or estimation can be performed substantially as described in the following example. The primary person 102 may also have connections with one or more secondary entities or persons 104a-d and/or a plurality of other persons. In one example the connection may be explicitly stated, such as listing another person as a friend or acquaintance on a personal webspace. In a second example the connection may be implied, such as if the primary person 102 posted a comment on the secondary person's 104a webspace. In a third example, the secondary person may have posted a comment on the primary person's webspace. In a fourth example, the primary and secondary persons may have both contributed to a blog or website. In a fifth example, an author of a blog or website may have cited both the primary person and secondary person as members of a community. One or more such connections can be determined and optionally recorded, for example ahead of time or when the person 102 is to be evaluated.

Similar to the primary person 102, the secondary person 104a may have a stated or implied aspects. For example, by searching a corresponding personal profile it can be determined that the secondary person has stated their age as being in the category "18 to 25". The person 104a is here represented as a star shape to conceptually indicate the property of having a stated age of 18-25 years. The stated or implied aspects may form a basis of a connection between the primary person and the secondary person. For example, the aspect may be the age or that both persons have stated their music interest to contain the value "Green Day". A connection between the two persons may be explicitly stated or inferred based on one particular aspect or a combination of aspects. Similarly, person 104b can also be in the 18-25 age range and is here also represented as a star shape. Person 104c can be in the 26-35 age range, and is represented here as a circle. Person 104d can be in the 17 and under age range, and is represented here as a triangle.

In a second example, a connection can include a phone call with another entity. In a third example, a connection can include an email or other electronic communication sent to or received from another entity.

The determination of one or more entities (e.g., the entities 104a-d) having a connection to the person 102 reflects the ages (and/or any other determined aspect, such as interest) of persons/entities that are associated with the person 102. This can be considered a distribution of ages (and/or any other aspect) among the connections that person 102 has. That is, in this conceptual example the distribution can reflect that the person 102 is determined to have two stars, a circle and a triangle associated therewith.

To determine an aspect value for the primary person 102, the distribution of connections can be compared with one or more reference distributions, for example in a category 106. The reference distribution can contain expected values for a particular aspect, or multiple aspects. For example, the category 106 may contain data relating to persons identified as having the age aspect value "18 to 25" because the category 106 represents the age range 18-25. Another category 110 may contain data relating to person identified as having the age aspect value "26-35". In this example, another category 112 can contain the age ranges "35 to 55", a category 114 can contain the age ranges "55 and up", and a category 116 can contain the age ranges "17 and under".

Each of the categories 106-116 can contain one or more reference distributions. For example, the category 106 in this example contains reference distributions 108a-c. For each reference distribution, a series of elements or a single element may have been used to determine the distribution for a particular age aspect. For example, the element 108a may consist of one example of a person with age aspect value "18 to 25". This person can conceptually be represented as the circle at the bottom of the reference distribution 108a. The connections determined for this stated 18-25 year-old person here indicate two stars and a circle. Thus, the reference distribution 108a in this example can be characterized as a circle connected to star-star-circle. The reference distribution 108a can be used, either singularly or in combination with other distributions, to determine or estimate as aspect of the person 102, such as their age.

In some implementations, a first person identified as having the age aspect value of "18 to 25" may have connections with other persons within a social network. The other persons may have stated or implied aspect values, for example, the first person may have connections with two other persons who have age values of "18 to 25" and another person with the age value "26 to 35". The connection structure and aspect values for the first person can be represented as the reference distribution 108a. Other elements can contain a connection structure and aspect values. For example, another person identified as having an age aspect value of "18 to 25" may have two connections to persons with the age values "18 to 25" but unlike the previous example have one connection to another person with the age value "10-17". The values for the particular elements can be used to determine a reference distribution 106. For example, it may be determined that persons with the age aspect value "18 to 25" on average, have two connections to other persons with age aspect value "18 to 25" and one other person with a different age aspect value. Thus, it may be determined that the person 102 would fall into the "18 to 25" category if they have a similar determined connection distribution to the "18 to 25" reference distribution 106. A confidence value can be determined for the estimate based on the similarity to the reference distribution. Alternatively, a probability distribution of potential aspect values may be assigned to the person 102 which can be based on the confidence level. For example, it may be determined that a person 102 is 75% likely to be in the "18 to 25" category and 25% likely to be in the "26 to 35" category.

The reference distribution 108a may as another example contain discrete values for a particular aspect. For example, it may be determined that a person with an age aspect value of 19, on average has four connections with an average age aspect value of 20. In a second example it may be determined that a person with an age aspect value of 19 has three connections to persons with an average age of 19 and one person with an average age of 21. In a third example, it may be determined that a person with an age aspect value of 19 has on average 75% connections with age 19, 10% connections with age 18, 10% with age 20, and 5% all other ages. More complicated forms of the determined probability distribution can exist taking into account the distribution of the second order or higher connections in an iterative fashion, and/or multiple aspects simultaneously. Values within a reference distribution can represent the actual values of a particular aspect, or can be representative of a category. For example, the "18 to 25" value for an age aspect can be represented by the number 2. Other reference distributions can have any, all or none of the above characteristics.

Thus, after one or more reference distributions have been identified (e.g., any or all of the distributions in the categories 106-116), the person 102 and its connected persons/entities (e.g., any or all of the persons 104a-d) can be compared with some or all of the reference distributions. In some implementations, when a best matching (e.g., a most similar) reference distribution is found, the value of the corresponding category can be selected as the determined value for the person at issue. With regard to the person 102 it can be determined that the reference distribution 108a is the most similar one, for example because the person 102 is connected to star-star-circle-triangle and the reference distribution 108 has connections to star-star-circle. Because the reference distribution 108a relates to a person with the characteristic circle, the determination can be used as an indication that the person 102 should also be characterized as a circle. That is, if no corresponding characteristic were previously known for the person 102, the determined circle can be considered an estimate of that unknown characteristic. In contrast, if the person 102 had a stated characteristic of circle (or another value), the determination can be view as supporting the truth (or falsity) of the stated value.

In another implementation, the same or an analogous determination as was done for person 102 can be performed for an entity other than a person. The entity may be a website, a blog, or another online resource, to name a few examples. Other connected entities may be the same type of entity or a different entity. For example, the entity at issue may have connections to various websites, in addition to, or as an alternative to other persons in a social network. One example of a connection may be a hyperlink on the primary website. The various connected entities or the primary entity may have also have stated or implied aspect values. For example, a particular website may be associated primarily with a particular aspect value. The particular aspect value may be the name of a band, a movie, or other topic of interest, to name a few examples. In a second example, a website may have an intended audience of 18 to 25 year olds, such as a college oriented website, and thus may be assigned the age aspect value "18 to 25". In a third example a website may be geared to multiple age groups, such as a news website, and either have multiple age aspect values or no age aspect values. An unknown reference distribution can be determined various ways. For example, if the reference distribution of 18 to 25 year olds was not known for a particular website, such as MySpace, a representative sample of persons claiming to have the age aspect value 18 to 25 could be examined along with the associated connection structure and stated or implied aspects of the connected persons. Any number of methods can be used including statistical analysis or learning algorithms. Distribution information from subsequent determinations can be used to influence past determinations, by using a backpropagation algorithm, to name one example. Noise or outliers can be removed from the distributions or normalized using methods well known in the art.

Figure 2:
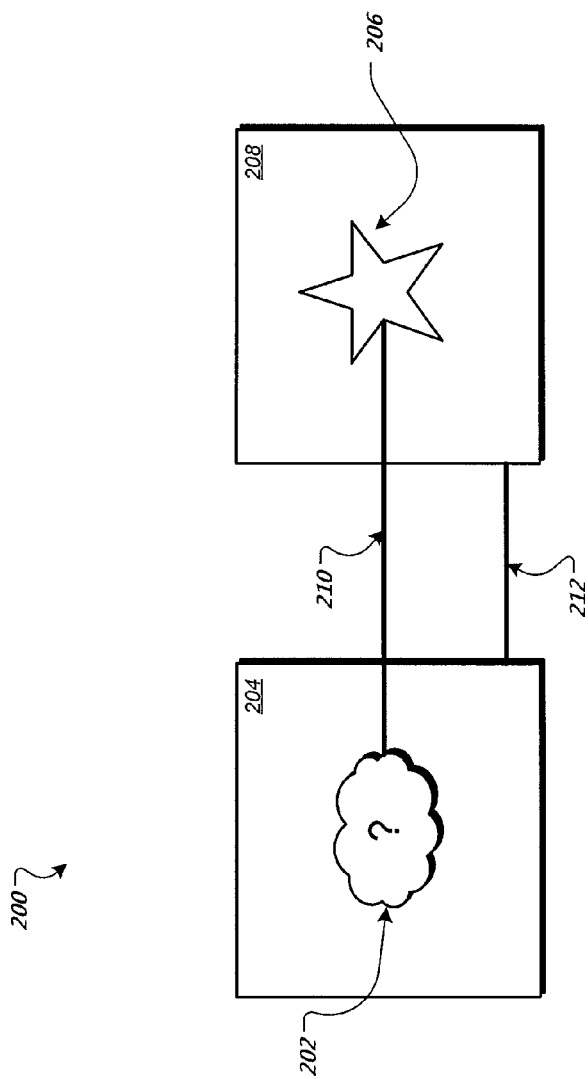
FIG. 2 depicts an example of local and global connections between two entities.

FIG. 2 shows an example 200 of local and global connections between two entities. A first person 202 is shown here as a cloud with a question mark, representative of the uncertainty in a particular aspect, such the age of that first person. The first person 202 can be member of a first online community 204. A second person 206 is represented as a star to show that a value has been determined for a particular aspect of that person; in this example the age aspect. The second person 206 belongs to a second online community 208. In some examples the online communities 206 and 208 may be the same online community or other environment. The first person 202 may have explicitly listed other persons as friends in the online community, including the second person 206. When a link 210 is explicitly stated between two or more persons, such as by one person naming another person as a friend, this can be considered a local link. In some examples, the local link can be indicative that the two persons share a common aspect value. The known value of the age aspect for the second person 206 can be compared with known distributions 106 to determine the age aspect value for the first person 202.

Another type of link may not be explicitly stated but may be implied, which can indicate a global connection 212. For example, if it is determined that person 206 likes a particular band, and person 202 has also been determined to like the same band, there exists an implied connection between them and others who have stated a preference for that particular band. Furthermore, if person 206 is in the 18-25 age range, it may be determined that person 202 is also likely in the 18-25 age range since person 206 stated a preference for the same band. This inference may be made regardless of any local links existing between persons 202 and 206. Less obvious inferences may be made depending on previously determined distributions. In some implementations, global connections can include two websites having a significant number of overlapping visitors, or two blogs that have a common author, a common set of readers, or a common citing website, to name just a few examples.

Although in the previous examples, the aspect determined for the second person 206 is the same as the aspect in question for the first person 202, in other examples, the aspect may be different. For example, if one was attempting to determine the age of a person 202, depending on what distributions are known or inferred, another aspect value or a combination of aspect values may be of interest. In a particular example, a stated interest of person 206 may include a college website, in which case, it may be inferred that person 206 is in the 18-25 age range, and therefore because person 202 listed person 206 as a friend, person 202 is likely in the same age range.

The connections indicated in the assembly of information 100 can be local links, global links, or any combination of the two. In some examples, the global and local links may be directional. For example, the first person 202 might list the second person 206 as a friend, thereby forming a local link, but the second person may not list the first person as a friend. In that example, the connection would be directional in that it is a one-way connection. When comparing a connection distribution with a reference distribution, the directionality of the connections can be taken into account.

Figure 3:
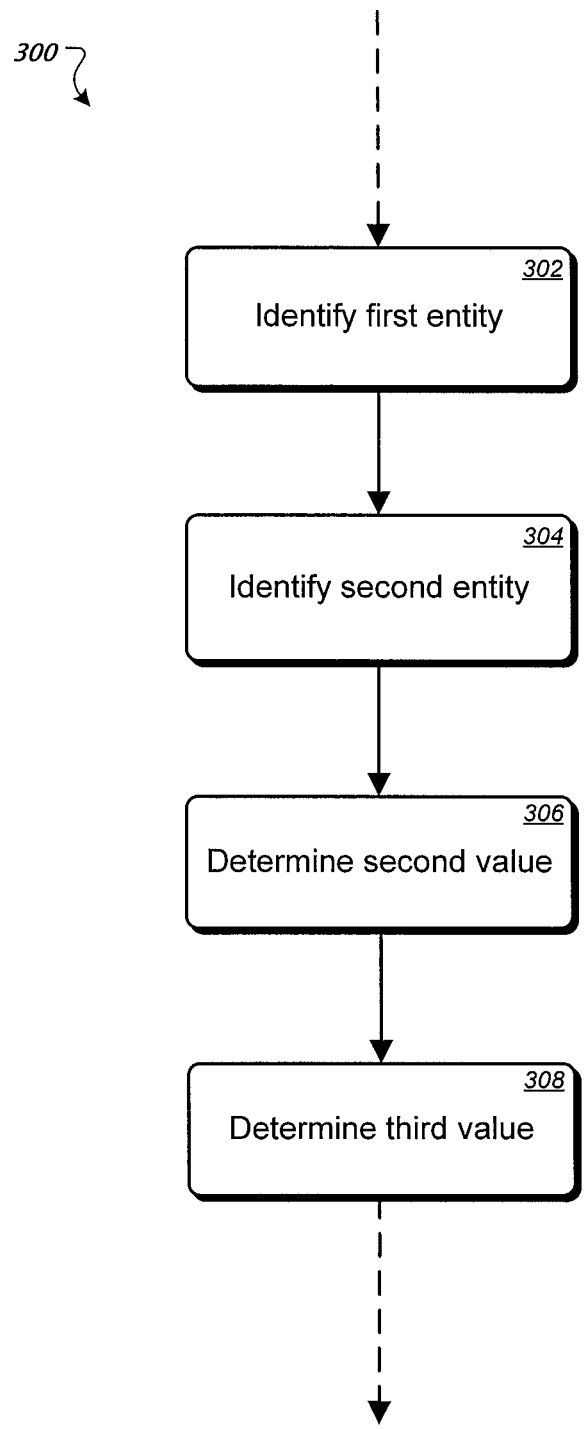
FIG. 3 is a flow chart depicting a procedure for determining an aspect value.

FIG. 3 is a flow chart depicting a procedure 300 for determining an aspect value. The procedure includes a step 302 to identify a first entity, for example, a person in an online community. The first entity is associated with a first aspect, and has a first value. For example, the aspect can be age, and the value can be 18-25. In step 304 a second entity is identified. For example, the second entity can be another person in the same online community as the first person. The second entity is connected to the first entity. For example, the first person may list the second person as friend. The first and second persons can be part of a reference distribution 108*a*. For example, the reference distribution can correspond to the age category 106.

In step 306 a second value is determined. The second entity is associated with a second aspect, and has a second value for the second aspect. The second aspect can, in some implementations, be different from the first aspect. For example, the second aspect can be gender and the second value can be female. Values for a particular aspect can be determined by reading a person's stated value for that aspect, or by inferring the value based on other distributions, to name two examples.

In step 308 a third value is determined for a third aspect of a third entity, for example, the age of a third person 102. In some implementations, the aspect value of the third person may not be known. The third value can be determined by comparing the connections and or aspect values of the first and second persons. For example, if an online retailer wanted to target advertising to a particular person, the retailer may want to know the age demographic of the third person. By comparing the age or other aspect distribution of the friends of the third person with a reference distribution, the retailer could determine an age for the third person, and target age appropriate advertising at that third person.

In a second example, an email service provider may want to identify characteristics of spammers or other malicious entities based on the connection structure. For example, if a group of users frequently sent out a link to a website identified as suspect, the service provider could identify them as potential spammers.

In a third example, a company could identify desirable candidates for a particular business or plan, based on the telephone calls the candidate has placed or received.

Figure 4:
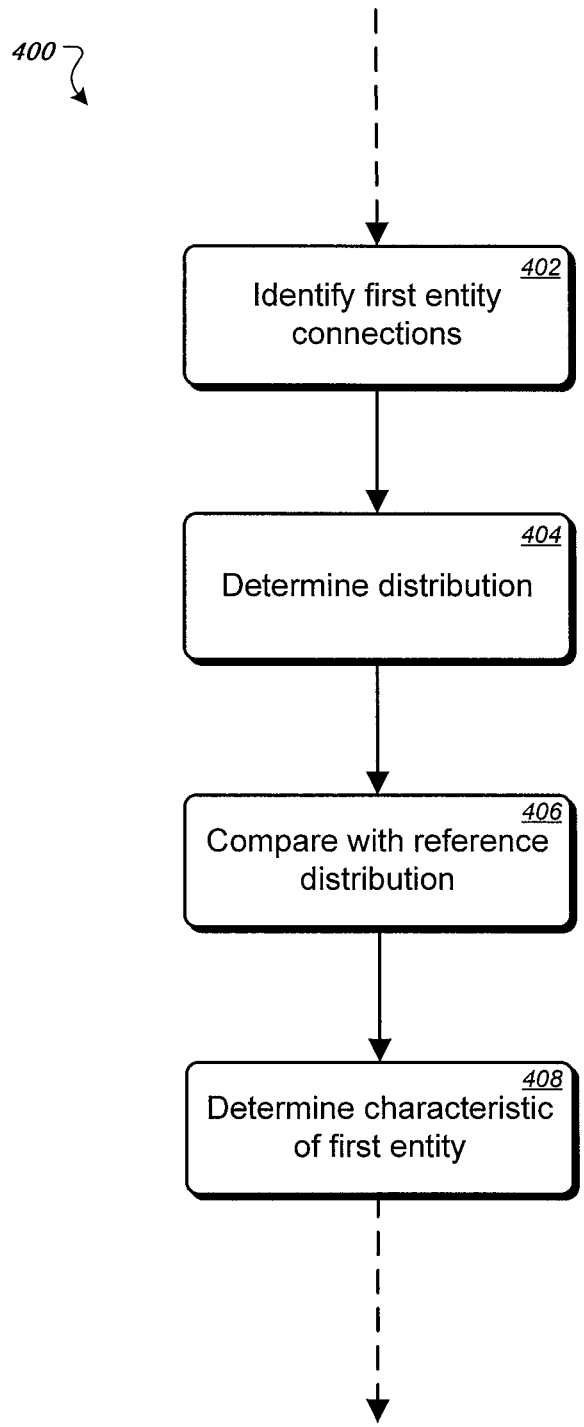
FIG. 4 is a flow chart depicting a procedure for determining a characteristic of an entity.

FIG. 4 is a flow chart depicting an example procedure 400 for determining a characteristic of an entity within a 5% threshold. The procedure includes a step 402 to identify first entity connections. For example, the entity can be a person in an online community, and the person may have listed other persons as friends. In that example, connections can be the links between the first person and their stated friends. Both the first person and their stated friends can have values for particular aspects. In step 404 a distribution is determined regarding some or all of the connected entities. For example, the first person's listed friends can have values for a particular aspect, such as age. A distribution can consist of the ages of the friends, or percentages of the friends belonging to a particular age category, to name two examples. In step 406, the determined distribution is compared with a reference distribution, such as the distribution 108*a*. For example, if the distributions are compared using percentages to represent the number of friends belonging to a particular age category, this can involve comparing the percentages in the two distributions to see if they are within a 5% threshold. As a specific example with reference to FIG. 1, the conceptual distribution of star-star-circle-triangle for the person 102 can be compared with any or all distributions in the categories 106-116, such as the star-star-circle distribution for the person 108*a*. The aforementioned distributions can be based on global connections, local connections, or any combination of the two. For example, a person may have stated a number of friends, representing local links, and a number of interests, which may match other persons not listed, representing global links.

In step 408, a characteristic of the first entity is determined. For example, if the two distributions matched within a 5% threshold, it can be determined that the first person is similar to the entity in the reference distribution, and therefore likely has the same age aspect value. In contrast, if the comparison shows the distributions to be different, it can be determined that the person is not very similar to the entity in the reference distribution. A confidence value can be assigned to the distribution according to how much it differs from the values in the reference distribution. If the distribution matched multiple reference distributions, the one with the highest confidence value can be used to determine the characteristic of the first person. In some implementations, a distribution may match multiple reference distributions or no reference distributions. A confidence value can also be assigned to a stated aspect value for the first entity. For example, if a person stated that their age was 30, and a value of 18-25 was determined by comparing with reference distributions, a lower confidence value might be assigned to their stated age than if the person had a stated age in the 18-25 range. In a particular example, a retailer targeting advertising content to the first entity based can do so based on either the stated aspect value or the determined aspect value, depending on which has the higher confidence value. In other implementations, distributions may be compared with reference distributions mapping higher order links between entities. For example, a distribution may be determined by examining friends of the listed friends of the first person, and so on recursively. A distribution may also be determined by examining aspects other than the one being determined for the first person. A determined distribution and any associated confidence values can be used to update an existing reference distribution.

In some of the above examples, the trustworthiness of an online character and/or the information they provide is determined by determining who the online character links to, and in turn, who the other linked-to character in turn links to in the community. Other approaches can be used. In some implementations, a probability value can be determined based on comparing with the values reported by one or more entities linked to the character being investigated.

In a particular example, a first online community member is identified who has declared an age of 24 years. A second online community member can then be identified as being connected to the first online community member, say by being linked to by the first member. It can be determined that the second online community member has a stated age of 26 years. Based on the second online community member's age, a probability value for the first member's age can be determined. That is, such a probability value can estimate the likelihood that the stated age of 24 years is the true age of the first member. Such a probability value can be determined using any of many techniques, such as data mining, predictive algorithms and/or statistical analysis. For example, a large number of ages for members of the online community can be analyzed to determine whether there is any statistically significant correlation between the ages of members who are linked to each other.

The probability value can be recorded. For example, it can be recorded as an indication of a truthfulness of the first entity in providing the first value as a response to the prompt regarding the first aspect. More than one value can be recorded, and the recording can be done in any of several ways, such as in a database.

Actions can be taken based on the probability value. For example, if the determined probability value is too low, further measures can be taken to try to determine the correct value and/or to exclude the member from the community. In some implementations, this determination can be done by comparing the probability value with a probability criterion. Such a probability criterion can be established based on past experience and/or based on statistical information that was used in determining the probability value, to name just a few examples.

As another example, the determination of a characteristic can involve use of one or more rules. With reference to FIG. 1, a rule can associate an aspect of the persons 102 and 104 with one or more other aspects. For example, each person may have an age attribute, an attribute for school degrees and an attribute for interests. In such a situation, the age attribute can be tied to the schooling attribute and/or to the interests attribute, for example. The rule can be human-derived, that is, a user can formulate the rule based on their knowledge, such as that age is sometimes related to the particular year of graduation and/or to having an interest in a particular topic. For example, an input screen in a computer system can allow a user to formulate a rule so that identified aspects such as characteristics are associated with each other. Based on such a rule, an evaluation can be performed for aspects of a single individual or between two or more individuals, to name a few examples.

In some implementations, a determined characteristic can be used to analyze a group of entities such as individuals. For example, a group of bloggers can be identified based on publications they have made in an online environment. Using techniques described herein, such as the determination of age based on association with at least another person, the bloggers can be categorized, for example in separate age groups based on their determined ages. This information can be used for various types of analysis, such as to gain knowledge about behavior in market segments or to investigate support for certain causes or ideas. In the example with bloggers, their postings can be categorized with regard to the various age groups that they belong to. In some implementations, a record can be created that reflects how the actions taken by the bloggers are distributed among the defined groups, based for example on age or any other characteristic.

A particular example is that a characteristic determined for an entity can be used for targeting a distribution of predefined content toward the entity. For example, people determined to have a certain interest can be contacted regarding a cause relating to the interest. As another example, a determined characteristic can be used for selecting advertisements to be distributed, electronically or otherwise, to a particular entity.

Figure 5:
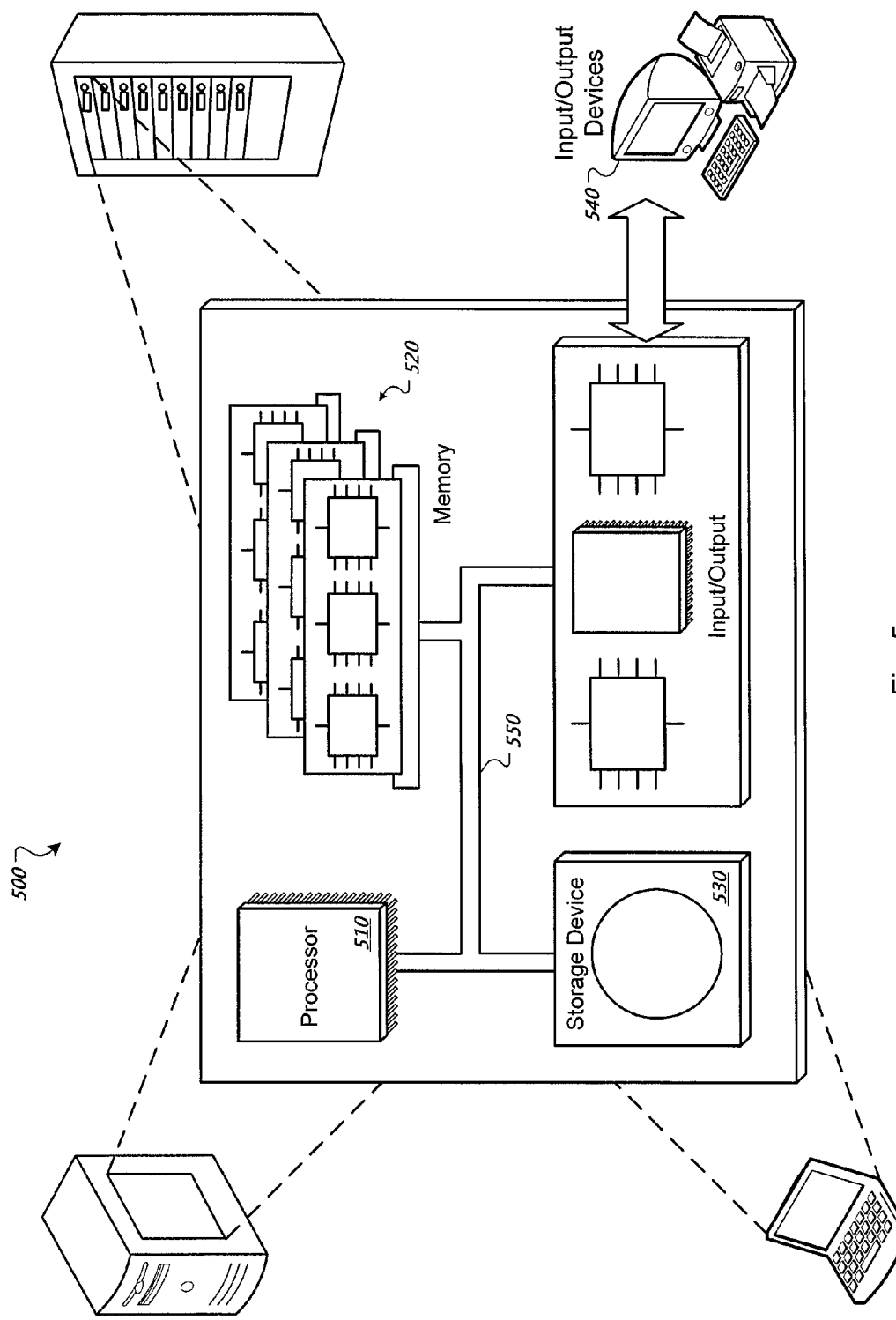
FIG. 5 is a block diagram of a computing system that can be used in connection with computer-implemented methods described in this document.

FIG. 5 is a schematic diagram of a generic computer system 500. The system 500 can be used for the operations described in association with any of the computer-implement methods described previously, according to one implementation. The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications may be made without departing from the spirit and scope of this disclosure. Accordingly, other embodiments are within the scope of the following claims.

What is claimed is:

1. A computer-implemented method comprising:
   receiving, in a computer system, a first value for a first attribute of an account of a user in an online community, the first attribute corresponding to a characteristic of the user associated with the account;
   identifying, using associations in the online community between the user and other users, a first set of accounts that are associated with the other users in the online community;
   determining, using the first set of accounts, a profile that reflects a distribution of values for at least one second attribute of the first set of accounts, the second attribute corresponding to a characteristic of the other users associated with the first set of accounts;
   identifying a second set of accounts of users in the online community for which the first attribute has been determined to correctly have the first value;
   determining, using the second set of accounts, a reference profile that reflects a distribution of values for the second attribute in the second set of accounts;
   comparing the profile that was determined using the first set of accounts with the reference profile; and
   determining whether the first value is truthful based on the comparison.

2. The method of claim 1, wherein the first value is self-declared by the user, who holds the account.

3. The method of claim 1, wherein the first attribute is a factual attribute about the user, who holds the account.

4. The method of claim 1, wherein the first value is a default value provided to the account.

5. The method of claim 1, wherein the second attribute is chosen based on a rule that associates the first attribute with the second attribute.

6. The method of claim 1, wherein the first attribute is identical to the second attribute.

7. The method of claim 1, further comprising:
   determining, using the first set of accounts, a second profile that reflects another distribution of values for at least one third attribute of the first set of accounts;
   identifying a third set of accounts of users in the online community for which the first attribute has been determined to correctly have the first value;
   determining, using the third set of accounts, a second reference profile that reflects a distribution of values for the third attribute in the third set of accounts; and
   comparing the second profile with the second reference profile;
   wherein the determination of whether the first value is truthful is based also on the comparison of the second profile with the second reference profile.

8. The method of claim 1, wherein the first attribute is different from the second attribute.

9. A computer program product tangibly embodied in a computer-readable storage device and comprising instructions that, when executed by a processor, causes the processor to perform operations that comprise:
   receiving, in a computer system, a first value for a first attribute of an account of a user in an online community, the first attribute corresponding to a characteristic of the user associated with the account;
   identifying, using associations in the online community between the user and other users, a first set of accounts that are associated with the other users in the online community;
   determining, using the first set of accounts, a profile that reflects a distribution of values for at least one second attribute of the first set of accounts, the second attribute corresponding to a characteristic of the other users associated with the first set of accounts;
   identifying a second set of accounts of users in the online community for which the first attribute has been determined to correctly have the first value;
   determining, using the second set of accounts, a reference profile that reflects a distribution of values for the second attribute in the second set of accounts;
   comparing the profile that was determined using the first set of accounts with the reference profile; and
   determining whether the first value is truthful based on the comparison.

10. A computer-implemented method comprising:
    determining, in a computer system, that a first attribute of an account lacks a first value, the first attribute corresponding to a characteristic of a user associated with the account;
    identifying, using associations in the online community between the user and other users, a first set of accounts that are associated with the other users in the online community;
    determining, using the first set of accounts, a profile that reflects a distribution of values for at least one second attribute of the first set of accounts, the second attribute corresponding to a characteristic of the other users associated with the first set of accounts;
    identifying a plurality of second sets of accounts of users in the online community for which the first attribute has an associated first value;
    determining, for each of the plurality of second sets of accounts, a reference profile that reflects a distribution of values for the second attribute in a respective of the plurality of second sets of accounts;
    comparing the profile that was determined using the first set of accounts with at least one of the reference profiles associated with the plurality of second sets of accounts; and
    determining the first value of the first attribute of the user based on the comparison.

11. The method of claim 10, wherein the first attribute is a factual attribute about the user, who holds the account.

12. The method of claim 10, wherein the first value is a default value provided to the account.

13. The method of claim 10, wherein the second attribute is chosen based on a rule that associates the first attribute with the second attribute.

14. The method of claim 10, wherein the first attribute is identical to the second attribute.

15. The method of claim 10, further comprising:
- determining, using the first set of accounts, a second profile that reflects another distribution of values for at least one third attribute of the first set of accounts;
- identifying a plurality of third sets of accounts of users in the online community for which the first attribute has an associated first value;
- determining, for each of the plurality of third sets of accounts, a second reference profile that reflects a distribution of values for the third attribute in a respective of the plurality of third sets of accounts; and
- comparing the second profile with at least one of the second reference profiles associated with the plurality of third sets of accounts;
- wherein determining the first value of the first attribute of the user is based also on the comparison of the second profile with the at least one of the second reference profiles.

16. The method of claim 10, wherein the first attribute is different from the second attribute.

* * * * *